(12) United States Patent
Yu et al.

(10) Patent No.: US 11,796,062 B2
(45) Date of Patent: Oct. 24, 2023

(54) SUPER WEAR-RESISTANT FLOATING SEAL RING AND MACHINING METHOD AND DEVICE THEREFOR

(71) Applicant: WUHAN XINHUAFENG MACHINERY MANUFACTURING CO., LTD, Hubei (CN)

(72) Inventors: Zhenghao Yu, Hubei (CN); Sichun Yu, Hubei (CN)

(73) Assignee: WUHAN XINHUAFENG MACHINERY MANUFACTURING CO., LTD, Hubei (CN)

( * ) Notice: Subject to any disclaimer, the term of this patent is extended or adjusted under 35 U.S.C. 154(b) by 58 days.

(21) Appl. No.: 17/616,697

(22) PCT Filed: Aug. 10, 2020

(86) PCT No.: PCT/CN2020/108067
§ 371 (c)(1),
(2) Date: Dec. 6, 2021

(87) PCT Pub. No.: WO2021/082606
PCT Pub. Date: May 6, 2021

(65) Prior Publication Data
US 2022/0349474 A1    Nov. 3, 2022

(30) Foreign Application Priority Data
Oct. 31, 2019   (CN) .......................... 201911050654.4

(51) Int. Cl.
*F16J 15/3204*    (2016.01)
(52) U.S. Cl.
CPC ............................... *F16J 15/3204* (2013.01)

(58) Field of Classification Search
CPC .... F16J 15/00; F16J 15/02; F16J 15/16; F16J 15/50; F16J 15/52; F16J 15/32; F16J 15/3204; F16J 15/3208; F16J 15/3212; F16J 15/3216; F16J 15/322; F16J 15/3232;
(Continued)

(56) References Cited

U.S. PATENT DOCUMENTS

| 2005/0110219 | A1* | 5/2005 | Tsuboi | F16J 15/344 277/358 |
| 2011/0285091 | A1* | 11/2011 | Wodrich | B22D 19/08 277/377 |
| 2019/0186632 | A1* | 6/2019 | Haas | F16J 15/3404 |

FOREIGN PATENT DOCUMENTS

CN            104728444 A  *  6/2015

* cited by examiner

*Primary Examiner* — Nathan Cumar

(57) ABSTRACT

A super wear-resistant floating seal ring includes: a ring body, wherein a working surface of the ring body has a C-shaped groove; the C-shaped groove is filled with a wear-resistant material layer to form a super wear-resistant core ring; a slope protection structure is provided on both sides of the C-shaped groove, and a slope surface is provided under the slope protection structure of the ring body; a pressing notch is formed on the slope surface; and an insertion hole, which is corresponding to the pressing notch, is drilled on an internal diameter of the ring body. A machining method therefor includes steps of: preparing the ring body of the floating seal ring; forming the C-shaped groove on the ring body; forming the wear-resistant material layer; forming the pressing notch and the insertion hole, and installing the floating seal ring; and grinding the wear-resistant material layer.

7 Claims, 3 Drawing Sheets

(58) Field of Classification Search
CPC .. F16J 15/3236; F16J 15/3268; F16J 15/3272; F16J 15/328; F16J 15/3284
USPC ........................................................ 277/549
See application file for complete search history.

SUPER WEAR-RESISTANT FLOATING SEAL RING AND MACHINING METHOD AND DEVICE THEREFOR

BACKGROUND OF THE PRESENT INVENTION

Field of Invention

The present invention relates to a technical field of machining, and more particularly to a super wear-resistant floating seal ring, and a machining method and device therefor.

Description of Related Arts

The sealing performance and working life of the floating seal ring are the core indicators of its quality, and oil leakage is a key sign of seal failure of the floating seal ring. There are many reasons for oil leakage. Among them, the long working time and the insufficient elasticity of the rubber ring are the most direct and common causes, which cannot compensate for the wear of the working surfaces of two iron rings, and makes the gap between the bonding surfaces larger, leading to leakage. At this time, replacing the floating seal is the only option. How to make the working surface of the floating seal ring more wear-resistant, the oil sealing effect and the working life more reliable and longer are the problems that need to be solved in the conventional production.

SUMMARY OF THE PRESENT INVENTION

An object of the present invention is to provide a super wear-resistant floating seal ring and machining method and device therefor. A special floating seal ring structure can make working surfaces more wear-resistant, and prolong a working life of the floating seal ring. Furthermore, the structure is simple to machining, which solves a problem of plane warping during grinding.

Accordingly, the present invention provides:

a super wear-resistant floating seal ring, comprising: a ring body, wherein a working surface of the ring body has a C-shaped groove; the C-shaped groove is filled with a wear-resistant material layer to form a super wear-resistant core ring; a slope protection structure is provided on both sides of the C-shaped groove, and a slope surface is provided under the slope protection structure of the ring body; a pressing notch is formed on the slope surface; and an insertion hole, which is corresponding to the pressing notch, is drilled on an internal diameter of the ring body; a groove width of the C-shaped groove is 2.5-5 mm.

The wear-resistant material layer adopts a mixed powder composed of chromium-molybdenum alloy powder, tungsten carbide alloy powder, and ceramic sand powder, which is welded into the C-shaped groove by laser or plasma arc welding.

The slope protection structure is 1.5-3 mm higher than the working surface of the floating seal ring.

A machining method for the super wear-resistant floating seal ring is also provided, comprising steps of:

step 1: preparing the ring body of the floating seal ring with a GCr15 bearing steel;

step 2: forming the C-shaped groove on the working surface of the ring body of the floating seal ring by machine turning;

step 3: filling the C-shaped groove with a mixed powder by laser or plasma arc welding, so as to form the wear-resistant material layer, wherein the mixed powder is composed of chromium-molybdenum alloy powder, tungsten carbide alloy powder, and ceramic sand powder;

step 4: forming the pressing notch and the insertion hole on the floating seal ring on which the wear-resistant material layer is formed, and installing the floating seal ring on three fan-shaped support plates; and step 5: installing the three fan-shaped support plates on a grinder, and then grinding the wear-resistant material layer of the floating seal ring with the grinder, in such a manner that a flatness and a smoothness of the working surface of the floating seal ring satisfy quality standards.

In the step 4, installing the floating seal ring on the three fan-shaped support plates comprises specific steps of:

S1: inserting positioning blocks on the fan-shaped support plates into the insertion hole on the internal diameter of the floating seal ring, so that the entire ring body is sleeved on the three fan-shaped support plates; and S2: installing work piece pressing plates to the fan-shaped support plates through bolts, and pressing and fixing clamping blocks of the work piece pressing plates into the pressing notch.

Each of the fan-shaped support plates comprises a base plate connected to the grinder; a mounting plate is provided on the base plate, and the positioning blocks corresponding to the insertion hole are provided on an external side of the mounting plate; bolt holes are drilled on a top surface of the mounting plate to facilitate insertion of the bolts, and the bolts are inserted into the bolt holes to fix the work piece pressing plate.

A machining device for the super wear-resistant floating seal ring is also provided, comprising: a grinder; wherein three fan-shaped support plates are installed on the grinder, and work piece pressing plates are installed on the fan-shaped support plates; clamping blocks of the work piece pressing plates are clamped into the pressing notch of the ring body; each of the fan-shaped support plates comprises a base plate connected to the grinder; a mounting plate is provided on the base plate, and positioning blocks corresponding to the insertion hole are provided on an external side of the mounting plate; bolt holes are drilled on a top surface of the mounting plate to facilitate insertion of bolts, and the bolts are inserted into the bolt holes to fix the work piece pressing plate.

An arc of the fan-shaped support plates is 120°; the mounting plates of the three fan-shaped support plates form a truncated table so as to support the internal diameter of the floating seal ring.

Compared with the prior art, the beneficial effect of the present invention is that: the wear-resistant core ring not only solves the problem of super wear resistance but also solves the problem of super difficult machining and poor flatness quality, which creates good conditions for solving the difficulties. The material cost is reduced, and the quality advantage is outstanding. The present invention has the advantages of energy saving and environmental protection, which has great market competitiveness.

DETAILED DESCRIPTION OF THE PREFERRED EMBODIMENT

The technical solutions in the embodiments of the present invention will be described clearly and completely in conjunction with the accompanying drawings. Obviously, the described embodiments are only a part of all the embodiments of the present invention, rather than all the embodiments. Based on the described embodiments of the present invention, all other embodiments obtained by those of ordinary skill in the art without creative work shall fall within the protection scope of the present invention.

Technical solutions of the present invention are as follows.

Figure 1:
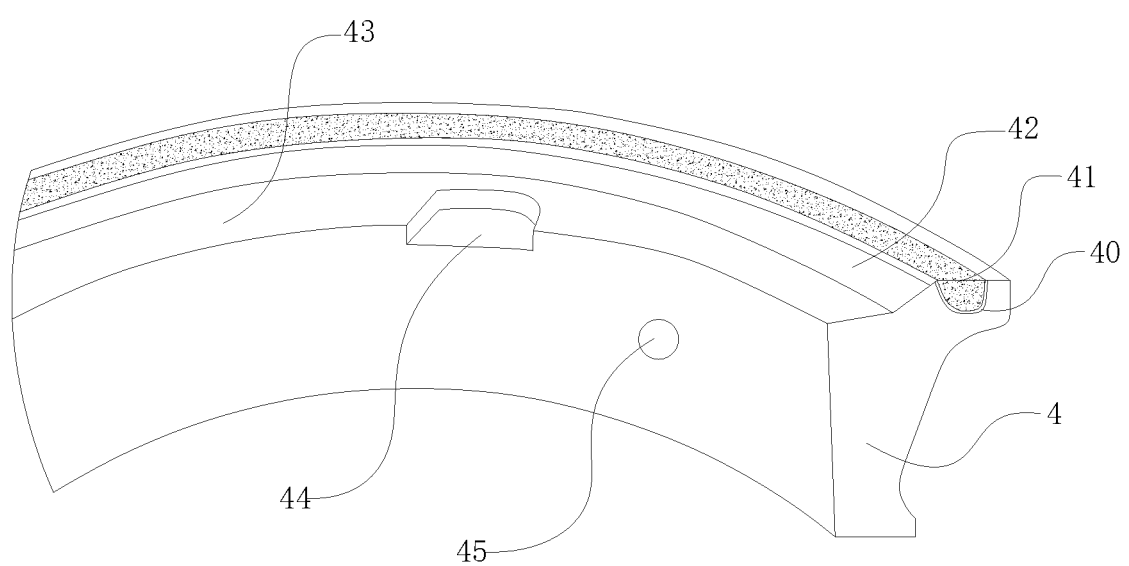
FIG. 1 is a structural view of a floating seal ring of the present invention.

Referring to FIG. 1, a super wear-resistant floating seal ring is illustrated, comprising: a ring body 4, wherein a working surface of the ring body 4 has a C-shaped groove 40; the C-shaped groove 40 is filled with a wear-resistant material layer 41 to form a super wear-resistant core ring; a slope protection structure 42 is provided on both sides of the C-shaped groove 40, and a slope surface 43 is provided under the slope protection structure 42 of the ring body 4; a pressing notch 44 is formed on the slope surface 43; and an insertion hole 45, which is corresponding to the pressing notch 44, is drilled on an internal diameter of the ring body 4; a groove width of the C-shaped groove 40 is 2.5-5 mm.

The wear-resistant material layer 41 adopts a mixed powder composed of chromium-molybdenum alloy powder, tungsten carbide alloy powder, and ceramic sand powder, which is welded into the C-shaped groove 40 by laser or plasma arc welding.

The slope protection structure 42 is 1.5-3 mm higher than the working surface of the floating seal ring.

Figure 2:
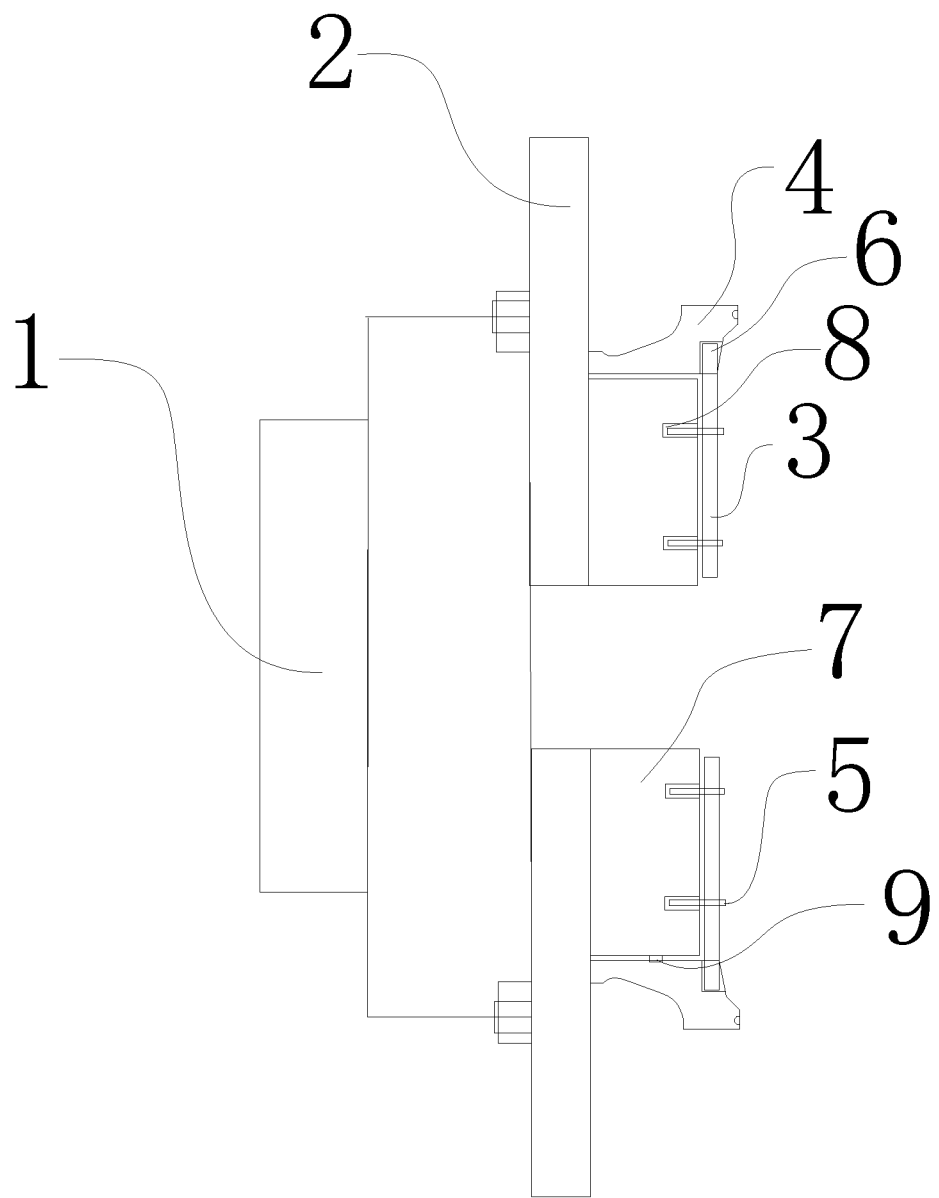
FIG. 2 is a structural view of a machining device of the present invention.
Figure 3:
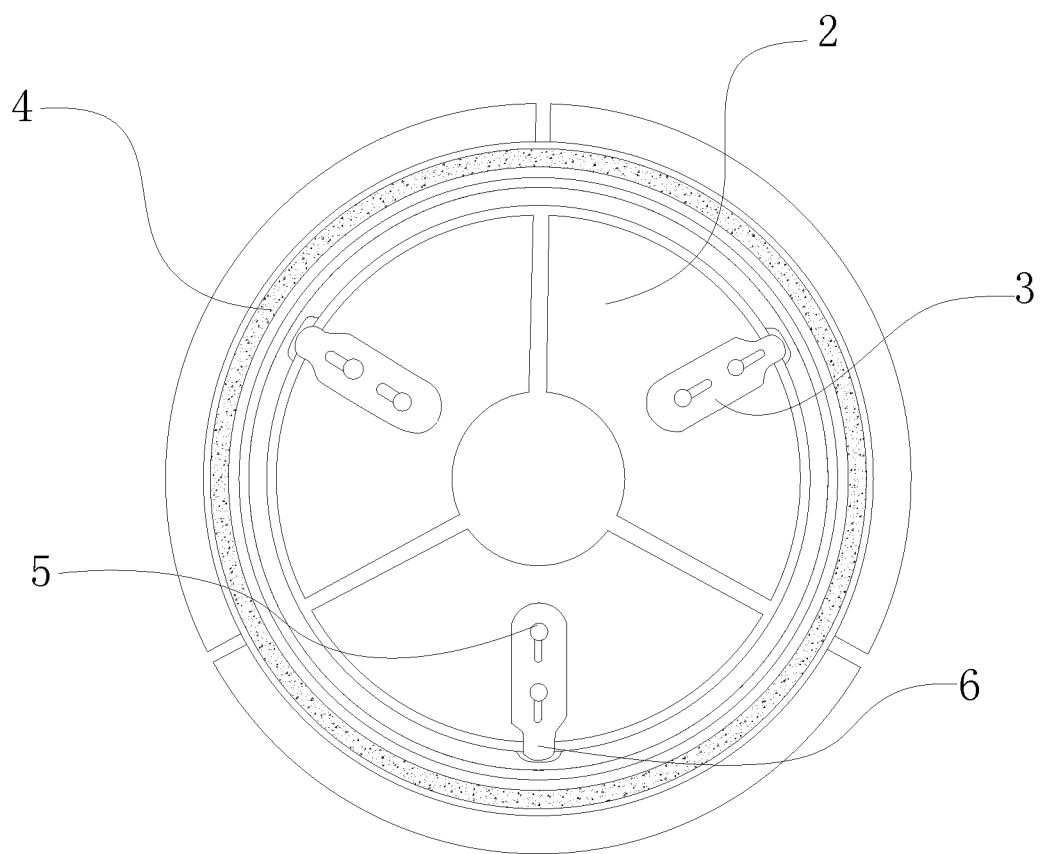
FIG. 3 illustrates a connection structure between the floating seal ring and the machining device of the present invention.

Referring to FIGS. 2 and 3, a machining device for the super wear-resistant floating seal ring is provided, comprising: a grinder 1; wherein three fan-shaped support plates 2 are installed on the grinder 1, and work piece pressing plates 3 are installed on the fan-shaped support plates 2; clamping blocks 6 of the work piece pressing plates 3 are clamped into the pressing notch 44 of the ring body 4; each of the fan-shaped support plates 2 comprises a base plate connected to the grinder 1; a mounting plate 7 is provided on the base plate, and positioning blocks 9 corresponding to the insertion hole 45 are provided on an external side of the mounting plate 7; bolt holes 8 are drilled on a top surface of the mounting plate 7 to facilitate insertion of bolts 5, and the bolts 5 are inserted into the bolt holes 8 to fix the work piece pressing plate 3.

An arc of the fan-shaped support plates 2 is 120°; the mounting plates 7 of the three fan-shaped support plates 2 form a truncated table so as to support the internal diameter of the floating seal ring.

A machining method for the super wear-resistant floating seal ring comprises steps of:

step 1: preparing the ring body 4 of the floating seal ring with a GCr15 bearing steel;

step 2: forming the C-shaped groove 40 on the working surface of the ring body 4 of the floating seal ring by machine turning;

step 3: filling the C-shaped groove 40 with a mixed powder by laser or plasma arc welding, so as to form the wear-resistant material layer 41, wherein the mixed powder is composed of chromium-molybdenum alloy powder, tungsten carbide alloy powder, and ceramic sand powder;

step 4: forming the pressing notch 44 and the insertion hole 45 on the floating seal ring on which the wear-resistant material layer 41 is formed, and installing the floating seal ring on three fan-shaped support plates 2; and step 5: installing the three fan-shaped support plates 2 on a grinder 1, and then grinding the wear-resistant material layer 41 of the floating seal ring with the grinder 1, in such a manner that a flatness and a smoothness of the working surface of the floating seal ring satisfy quality standards.

In the step 4, installing the floating seal ring on the three fan-shaped support plates 2 comprises specific steps of:

S1: inserting positioning blocks 9 on the fan-shaped support plates 2 into the insertion hole 45 on the internal diameter of the floating seal ring, so that the entire ring body 4 is sleeved on the three fan-shaped support plates 2; and S2: installing work piece pressing plates 3 to the fan-shaped support plates 2 through bolts 5, and pressing and fixing clamping blocks 6 of the work piece pressing plates 3 into the pressing notch 44.

Each of the fan-shaped support plates 2 comprises a base plate connected to the grinder 1; a mounting plate 7 is provided on the base plate, and the positioning blocks 9 corresponding to the insertion hole 45 are provided on an external side of the mounting plate 7; bolt holes 8 are drilled on a top surface of the mounting plate 7 to facilitate insertion of the bolts 5, and the bolts 5 are inserted into the bolt holes 8 to fix the work piece pressing plate 3.

The present invention adopts unique process design. First, a floating seal iron ring blank is machined, and the groove is formed on the working surface to be filled and welded with the wear-resistant material. Second, a new wear-resistant working surface bright belt ring is prepared by laser, plasma arc welding and other methods. Due to metallurgical combination, the new wear-resistant material working surface is firmly fused with the base material, and will never peel off. It is not only super wear-resistant, but also very resistant to axial and radial impact. Such performance is absolutely superior over those of cast rings. Because the wear-resistant layer formed by welding is much harder than the base material and has a certain thickness, it shows properties of cast iron such as being rigid, brittle, and non-deformable, which is conducive to improvement of flatness of the wear-resistant surface. Third, the oil sealing working surface bright belt ring of the floating seal iron ring adopts a unique and original high-boss design, wherein the super wear-resistant material forms the core ring, and slope-dam type core-protecting slopes are arranged at internal and external diameter sides of the core ring, so as to cover the super wear-resistant material like a dam, thereby forming the wear-resistant core ring. At the same time, there is at least 1.5-3 mm between the high-boss wear-resistant layer and its base (which is determined according to different diameters of floating seal type gauge). After a pair of working surfaces are attached, the end surface of the internal diameter will form a 3-6 mm wide lubricating oil inlet, which is doubled than lubricating oil inlets of conventional floating seal iron rings. Increase of the opening makes it easier for the lubricating oil to penetrate into the working surface, which not only helps to reduce friction of the working surface, but also prolongs a service life. Especially, the wear-resistant core ring of the high-boss working surface not only solves the problem of super wear resistance, but also solves the problem of super difficult machining and poor flatness quality, which creates good conditions for solving the difficulties. Because the internal and external diameter core protection slope and the base iron ring of the wear-resistant core ring made of the wear-resistant materials are all ordinary steel, their hardness is not high, and are easy to process and shape. Compared with conventional precisely casted carbide floating seal ring, the present invention has a particularly high material hardness and is particularly wear-resistant. Furthermore, a large-end surface needs to be processed across the entire surface. The surface to be processed is very wide, and it is also a key part with the highest quality requirements. Therefore, the difficulty of processing becomes another important factor that makes it difficult to reduce the manufacturing cost. The present invention provides an original and unique new process design and machining measures, which scientifically and ingeniously solves the above problem. The wear-resistant core ring made of the novel super wear-resistant material most thoroughly and economically solves the difficulty of super wear-resistance and long service life of the floating seal ring. The scientific and reasonable design of the high-boss wear-resistant core ring solves the difficult problem of high-hard phase materials which are hard, brittle and difficult to process. The internal and external diameters of the novel high-boss wear-resistant core ring are protected by steel materials on both sides of the slope protection and the core ring surface is 3 mm wide, so the narrow processing surface greatly reduces the processing difficulty. Furthermore, other construction measures and tooling coordination also greatly reduce the processing cost, so as to achieve high-efficiency production and meet quality standards. As a result, the problems of high hardness and difficult processing are completely solved by the unique scientific design of the high-boss working bright belt surface of the unique novel wear-resistant core ring, as well as its supporting scientific optimization processing, process tooling measures, machining methods, etc.

Although the super wear-resistant metal material, which is used to fill the wear-resistant core ring, adopts rare metal in the proportion, only a little rare metal is used at key portions. As a result, the material cost is greatly reduced, and the quality is greatly improved. The conventional casting high chromium molybdenum and cemented carbide floating seal iron rings are all cast as a whole. In fact, only the wear-resistant layer of the working surface, which is 2-3 mm thick, needs to be wear resistant, which means the rest of the entire floating seal ring base does not need to be wear resistant. The remaining 95% of the rare metals in the base are all useless and wasted, and this is also the reason why the cost of casting floating seal rings is high and difficult to reduce. Moreover, due to the qualification rate of casting products, the cost is more difficult to be reduced. The floating seal ring only requires the large-end working surface bright belt to be wear resistant, and once the working surface bright belt is worn by 1.5-3 mm, the oil seal ring fails and should be scrapped. This is because the resilience of the rubber ring has exceeded its limit, and it is simply unable to compensate for this wear space. As a result, oil leakage occurs in a large gap formed. However, the new-material wear-resistant working surface of the super wear-resistant floating seal iron ring manufactured by the present invention adopts a high-boss design with a height of 1.5-3 mm (determined by sizes of different gauge products), and the height is also the thickness of the new-material wear-resistant layer. A newly filled working surface bright belt ring of the floating seal iron ring only uses rare metal at an area of width 2-3 mm×thickness 2-3 mm×external circumference of the product. For the floating seal ring which is entirely casted with rare metals, the iron ring will also fail and be scrapped after the wear-resistant layer of the working surface is worn by at most 1.5-2.5 mm in thickness. However, since the casting ring as a whole is made of rare metals, more than 90% of the rare metals are discarded as waste, which is undoubtedly a huge waste of rare resources and the fundamental reason why the cost remains high. When it comes to the novel super wear-resistant floating seal ring of the present invention, due to the scientific design where key material is used only at key portions, the material cost is reduced, and the quality advantage is outstanding The present invention has the advantages of energy saving and environmental protection, which has great market competitiveness.

For the novel super wear-resistant floating seal ring, the super wear-resistant hard phase material is used on the oil seal working surface where the floating seal ring needs to be super wear-resistant, and thus makes the floating seal ring super wear-resistant and long in service life. To solve the processing difficulty of the super wear-resistant material caused by high hardness and high brittleness, the present invention adopts original and unique scientifically optimized process design, practical and effective tooling, and the machining method, which effectively ensures the high precision flatness quality standard of the wear-resistant core ring of the floating seal ring made of the super wear-resistant hard material.

Each of the three fan-shaped support plates is equipped with a workpiece pressing plate on the external surface, and each pressing plate has a sliding hole slot. Correspondingly, two bolt holes are drilled and tapped on each of the fan-shaped support plates, and the workpiece pressing plate is fixed on the fan-shaped support plate with bolts. The workpiece pressing plate has grooves to be adjusted in a radial direction. The workpiece pressing plate extends into the floating seal ring pressing notch, and then the bolts are screwed to fix the workpiece pressing plate. The thickness of the workpiece pressing plate is equal to the depth of the pressure notch. The three workpiece pressure plates press and hold a ring to be ground at a large-end surface of the floating seal ring.

Because a surface width of the wear-resistant core ring is 2.5-5 mm, although the material has high hardness and is particularly wear-resistant, the high-boss design makes the width of the wear surface narrow, which is only a few millimeters. In addition, the internal and external sides of the boss adopt the steel slope protection structure, thereby avoiding chipping or cracking problems. As a result, the grinding difficulty is reduced, the machining is easy, and the qualification rate is high.

Meanwhile, since the three workpiece pressing plates are inserted into the groove or hole at the internal diameter of the ring, the floating seal ring is almost ground without radial extrusion by external force, which easily eliminates the problem of plane warping of the floating seal ring working bright belt surface, thereby completely guaranteeing that the flatness meets the quality requirements of high-standard and high-quality products.

Despite the embodiments of the present invention have been shown and described, those of ordinary skill in the art can understand that various changes, modifications, substitutions and variations can be made to these embodiments without departing from the principle and spirit of the present invention. The scope of the present invention is defined by the appended claims and their equivalents.

What is claimed is:

1. A super wear-resistant floating seal ring, comprising: a ring body (4), wherein a working surface of the ring body (4)

has a C-shaped groove (40); the C-shaped groove (40) is filled with a wear-resistant material layer (41) to form a super wear-resistant core ring; a slope protection structure (42) is provided on one side of the C-shaped groove (40), and a slope surface (43) is provided under the slope protection structure (42) of the ring body (4); a pressing notch (44) is formed on the slope surface (43); and an insertion hole (45), which is corresponding to the pressing notch (44), is drilled on an internal diameter of the ring body (4); a groove width of the C-shaped groove (40) is 2.5-5 mm.

2. The super wear-resistant floating seal ring, as recited in claim 1, wherein the wear-resistant material layer (41) adopts a mixed powder composed of chromium-molybdenum alloy powder, tungsten carbide alloy powder, and ceramic sand powder, which is welded into the C-shaped groove (40) by laser or plasma arc welding.

3. A machining method for the super wear-resistant floating seal ring as recited in claim 1, comprising steps of:
 step 1: preparing the ring body (4) of the floating seal ring with a GCr15 bearing steel;
 step 2: forming the C-shaped groove (40) on the working surface of the ring body (4) of the floating seal ring by machine turning;
 step 3: filling the C-shaped groove (40) with a mixed powder by laser or plasma arc welding, so as to form the wear-resistant material layer (41), wherein the mixed powder is composed of chromium-molybdenum alloy powder, tungsten carbide alloy powder, and ceramic sand powder;
 step 4: forming the pressing notch (44) and the insertion hole (45) on the floating seal ring on which the wear-resistant material layer (41) is formed, and installing the floating seal ring on three fan-shaped support plates (2); and
 step 5: installing the three fan-shaped support plates (2) on a grinder (1), and then grinding the wear-resistant material layer (41) of the floating seal ring with the grinder (1), in such a manner that a flatness and a smoothness of the working surface of the floating seal ring satisfy quality standards.

4. The machining method, as recited in claim 3, wherein in the step 4, installing the floating seal ring on the three fan-shaped support plates (2) comprises specific steps of:

S1: inserting positioning blocks (9) on the fan-shaped support plates (2) into the insertion hole (45) on the internal diameter of the floating seal ring, so that the entire ring body (4) is sleeved on the three fan-shaped support plates (2); and
 S2: installing work piece pressing plates (3) to the fan-shaped support plates (2) through bolts (5), and pressing and fixing clamping blocks (6) of the work piece pressing plates (3) into the pressing notch (44).

5. The machining method, as recited in claim 4, wherein each of the fan-shaped support plates (2) comprises a base plate connected to the grinder (1);
 a mounting plate (7) is provided on the base plate, and the positioning blocks (9) corresponding to the insertion hole (45) are provided on an external side of the mounting plate (7); bolt holes (8) are drilled on a top surface of the mounting plate (7) to facilitate insertion of the bolts (5), and the bolts (5) are inserted into the bolt holes (8) to fix the work piece pressing plate (3).

6. A machining device for the super wear-resistant floating seal ring as recited in claim 1, comprising: a grinder (1); wherein three fan-shaped support plates (2) are installed on the grinder (1), and work piece pressing plates (3) are installed on the fan-shaped support plates (2); clamping blocks (6) of the work piece pressing plates (3) are clamped into the pressing notch (44) of the ring body (4); each of the fan-shaped support plates (2) comprises a base plate connected to the grinder (1); a mounting plate (7) is provided on the base plate, and positioning blocks (9) corresponding to the insertion hole (45) are provided on an external side of the mounting plate (7); bolt holes (8) are drilled on a top surface of the mounting plate (7) to facilitate insertion of bolts (5), and the bolts (5) are inserted into the bolt holes (8) to fix the work piece pressing plate (3).

7. The machining device, as recited in claim 6, wherein an arc of the fan-shaped support plates (2) is 120°; the mounting plates (7) of the three fan-shaped support plates (2) form a truncated table so as to support the internal diameter of the floating seal ring.

* * * * *